United States Patent [19]

Taylor

[11] 4,373,856
[45] Feb. 15, 1983

[54] TIE BUTT HANDLER

[76] Inventor: Glenn E. Taylor, P.O. Box 53006, Atlanta, Ga. 30318

[21] Appl. No.: 81,210

[22] Filed: Oct. 2, 1979

Related U.S. Application Data

[63] Continuation-in-part of Ser. No. 27,807, Apr. 6, 1979, abandoned, which is a continuation of Ser. No. 833,795, Mar. 6, 1978, abandoned, which is a continuation of Ser. No. 694,925, Jun. 11, 1976, Pat. No. 4,077,328.

[51] Int. Cl.³ .............................................. B60P 1/54
[52] U.S. Cl. ............................. 414/470; 105/215 C; 105/261 A; 105/275; 180/327; 298/7; 298/9; 298/177; 298/38; 414/486; 414/489; 414/549; 414/555; 414/739
[58] Field of Search ............... 414/469, 470, 486, 487, 414/489, 491, 541, 544, 549, 550, 555, 739, 695; 298/7, 9, 17.6, 17.7, 38; 105/215 C, 261 A, 263, 271-275; 180/326, 327, 331

[56] References Cited

U.S. PATENT DOCUMENTS

| | | |
|---|---|---|
| 810,646 | 1/1906 | Harris . |
| 1,429,847 | 9/1922 | Davids . |
| 1,498,962 | 6/1924 | Gorsuch et al. ................ 298/9 |
| 1,515,329 | 11/1924 | Barkmann et al. ............. 414/489 |
| 1,653,873 | 12/1927 | Poth . |
| 1,722,692 | 6/1929 | Winn . |
| 1,968,117 | 7/1934 | Alexander et al. . |
| 2,174,956 | 10/1939 | Allison ............................. 298/9 |
| 2,278,446 | 4/1942 | Hutchinson . |
| 2,484,689 | 10/1949 | Davis ............................. 414/489 |
| 2,621,072 | 12/1952 | Sherburne . |
| 2,786,361 | 3/1957 | Russell . |
| 2,786,590 | 3/1957 | Edwards et al. . |
| 2,831,544 | 4/1958 | Dunn et al. .................... 180/326 |
| 2,886,340 | 5/1959 | Kraemer . |
| 2,887,339 | 5/1959 | Reid . |
| 2,897,985 | 8/1959 | Carlson .......................... 414/544 |
| 3,122,251 | 2/1964 | Gardipee ....................... 414/489 |
| 3,281,186 | 10/1966 | Davis . |
| 3,304,100 | 2/1967 | Long .............................. 414/695 |
| 3,326,605 | 6/1967 | Steingas et al. . |
| 3,584,917 | 6/1971 | Ullenberg . |
| 3,638,810 | 2/1972 | Mathew ......................... 414/544 |
| 3,712,490 | 1/1973 | Schaeff ......................... 414/695 |
| 3,730,591 | 5/1973 | Griffis . |
| 3,800,966 | 4/1974 | Newton ......................... 414/555 |
| 3,874,306 | 4/1975 | Coons et al. ................. 105/215 C |
| 3,876,095 | 4/1975 | Stedt ............................. 414/487 |

FOREIGN PATENT DOCUMENTS

| | | |
|---|---|---|
| 625134 | 11/1926 | France . |
| 930194 | 6/1961 | United Kingdom . |

*Primary Examiner*—Robert B. Reeves
*Assistant Examiner*—Michael J. Forman
*Attorney, Agent, or Firm*—George M. Thomas

[57] ABSTRACT

The self-propelled load carrying vehicle includes a vehicle framework supported by road wheels, and railroad wheels are mounted on the framework and are movable up and down with respect to the framework for supporting the vehicle from the railroad track. The rear road wheels propel the vehicle along the track. A sub-frame is rotatably mounted on the vehicle framework about an upwardly extending axis, and dump body is pivotally mounted on the sub-frame about an approximately horizontal axis. A conveyor is mounted to the rear end of the sub-frame and rotates with the sub-frame and dump body and receives the load from the dump body when the dump body is tilted and progressively urges the load on beyond the rear opening of the dump body. A crane assembly is mounted on the vehicle framework forwardly of the dump body and the boom support and operator's station are movable together from beyond one side of the vehicle to beyond the other side of the vehicle to enable the graple of the crane to retrieve crosstie butts that are located immediately adjacent and outwardly to the side of the railroad track and to provide clear visibility for the vehicle operator.

12 Claims, 13 Drawing Figures

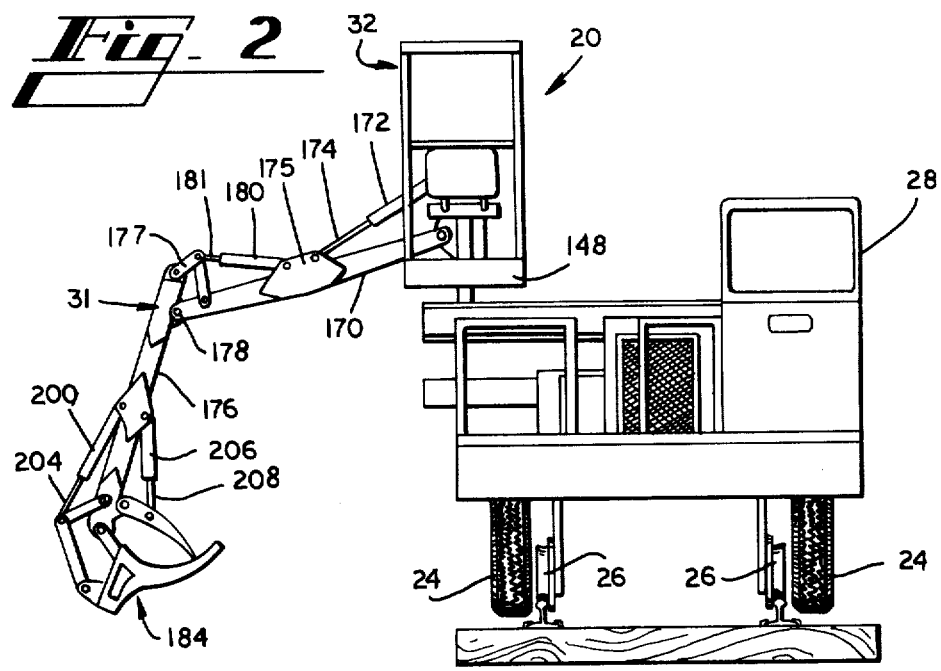
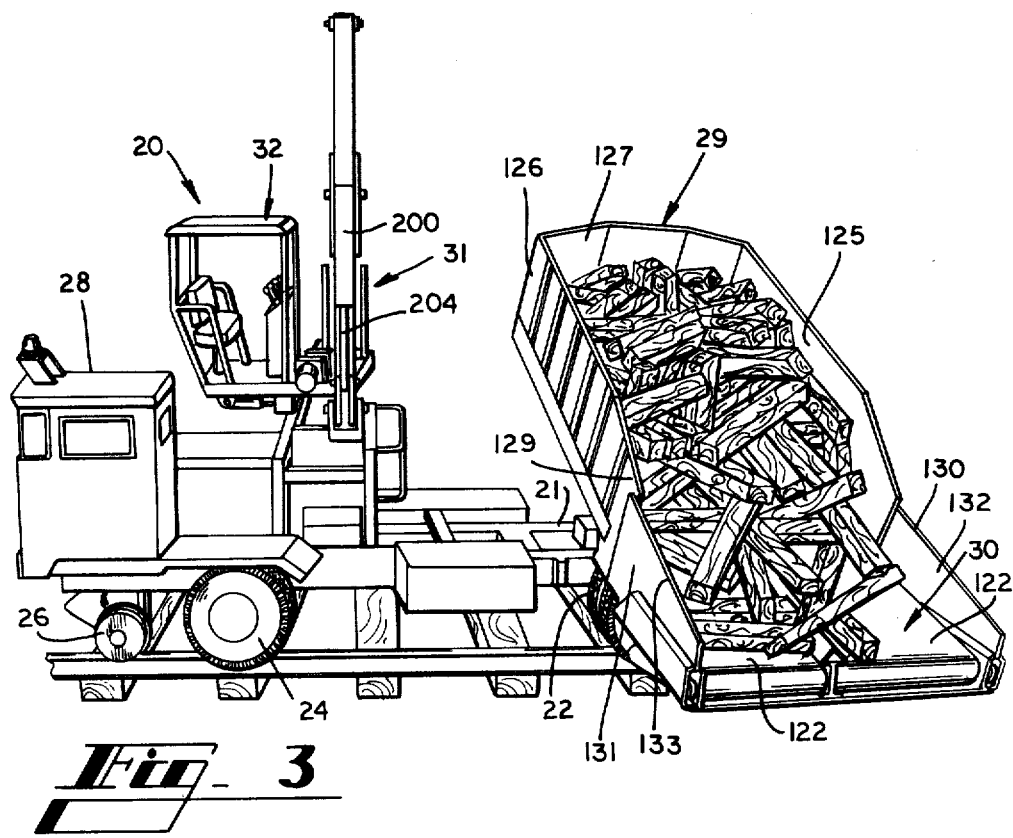

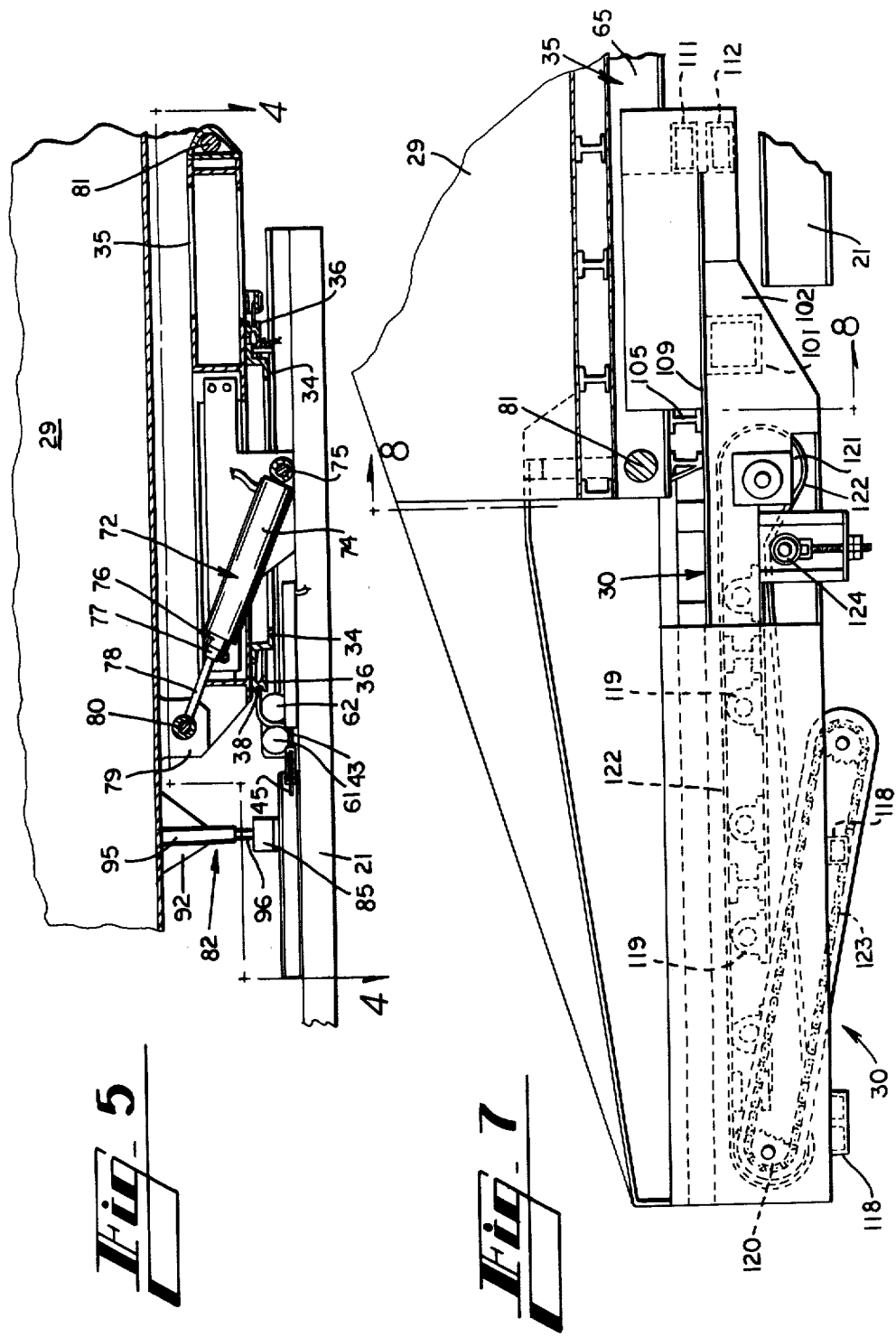

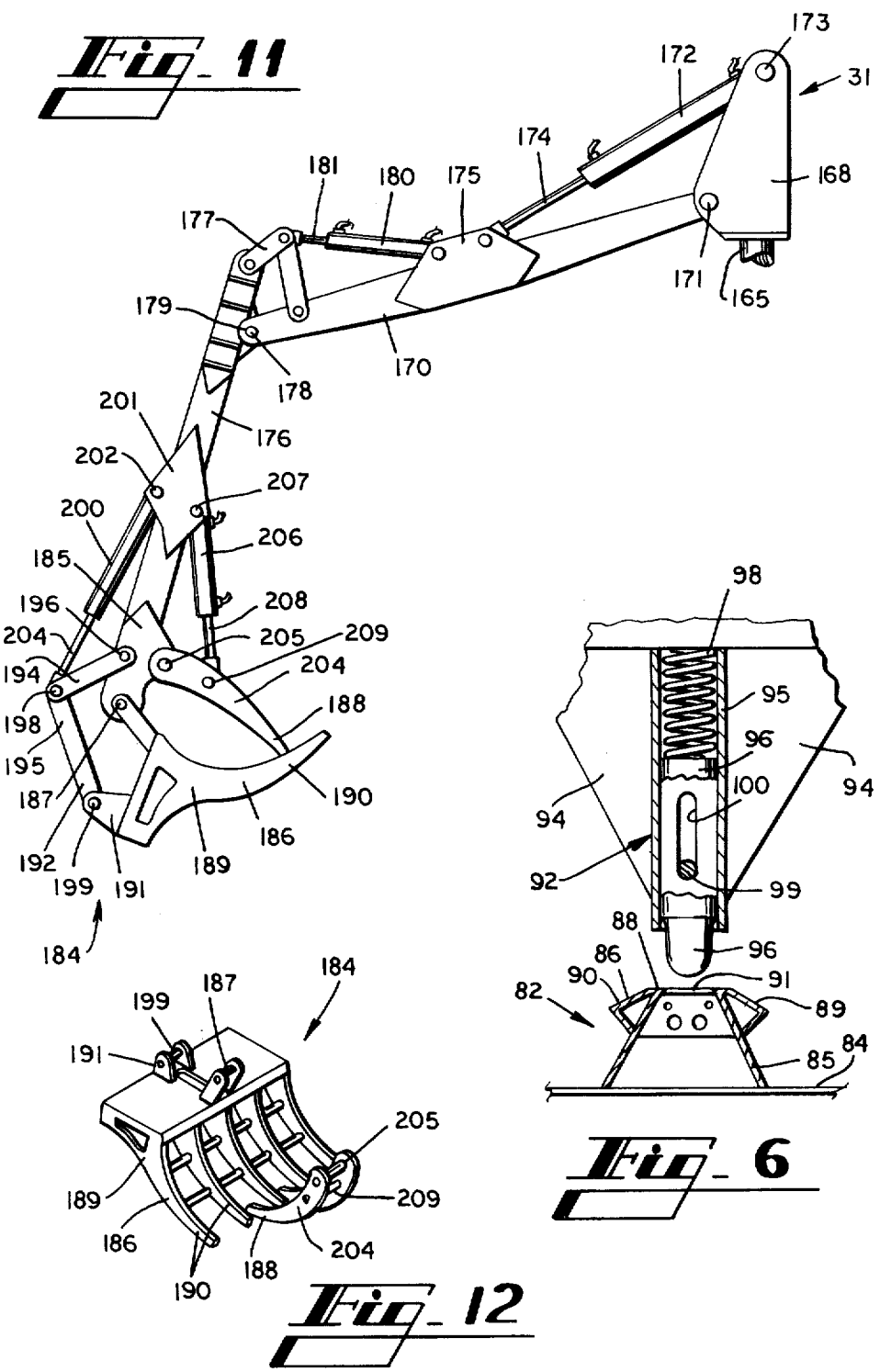

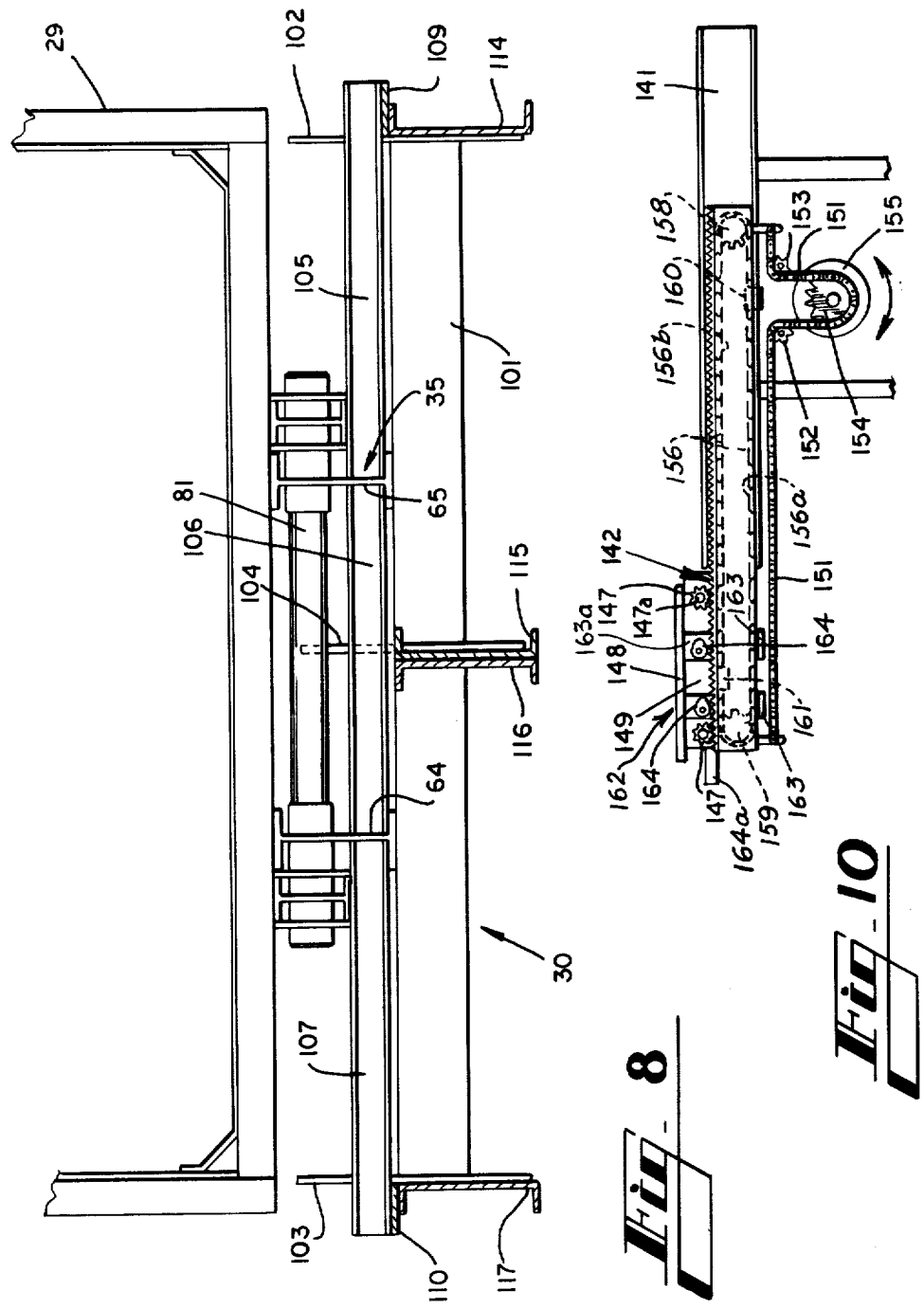

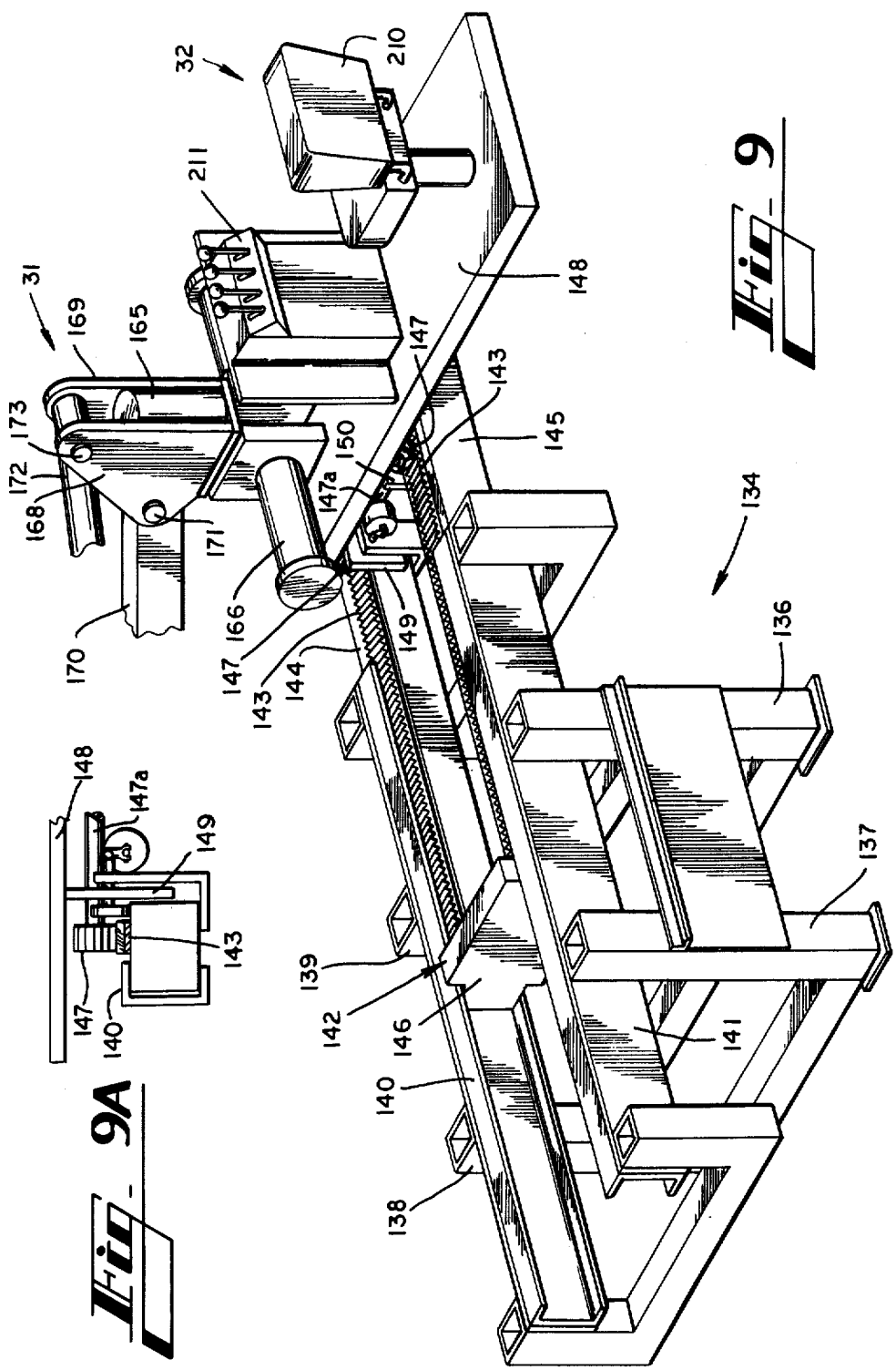

TIE BUTT HANDLER

CROSS REFERENCE TO RELATED APPLICATION

This application is a continuation-in-part of U.S. application Ser. No. 27,807, filed Apr. 6, 1979, now abandoned, which application is a continuation of U.S. application Ser. No. 883,795, filed Mar. 6, 1978 now abandoned, which application was a continuation of application Ser. No. 694,925, filed June 11, 1976, now U.S. Pat. No. 4,077,328.

TECHNICAL FIELD

This invention relates to a self-propelled load carrying vehicle particularly suitable for use on and off a railroad track. The vehicle includes a framework having road wheels and retractable railroad wheels for engaging the rails of a railroad track and for supporting the vehicle on a railroad track, a sub-frame which is rotatable about an approximately upright axis with respect to the vehicle framework and a dump body and rear conveyor mounted on and rotatable with the sub-frame. The dump body is tiltable with respect to the sub-frame about an approximately horizontal axis to progressively dump its load onto the conveyor, and the conveyor progressively urges the load on beyond the rear opening of the dump body. A crane assembly is movably mounted on the vehicle framework in front of the rotatable and tiltable dump body and is used to load objects from adjacent the railroad track upon which the vehicle is supported to the dump body.

BACKGROUND ART

One of the most common railroad track maintenance functions is the replacement of old cross ties beneath the rails of a railroad track and the rebuilding of the ballast about the crossties. One procedure in the replacement of railroad crossties is to cut the ties across their lengths at a position between the rails of the track and force the halfs or "butts" of the crossties laterally out from beneath the rails. The space previously occupied by the old crosstie is then filled with a new crosstie and the ballast about the crosstie is repaired. As the work progresses, a trail of crosstie butts are left behind on both sides of the railroad track.

The crosstie butts and other objects strewn about the railroad tracks must be removed. In the past, manual labor has been required to hoist the tie butts to a load carrying vehicle mounted on the railroad tracks, and after the vehicle was loaded, the vehicle was moved to a dump location where its load was removed for disposal, etc. More recently, automated equipment has been substituted for the manual workers and included, for example, one self-propelled vehicle mounted on and movable along the rails of the railroad track and which included a crane or other loading device for mechanically grasping and loading the tie butts and another self-propelled load carrying vehicle mounted on and movable along the rails which followed the loading vehicle and received the tie butts and transported the tie butts to a removal area. While this procedure has reduced the number of people required to perform the desired function, it still requires at least two operators and two vehicles.

Various self-propelled load carrying vehicles have been developed in the past which can travel over a flat road surface and which also can travel on railroad tracks. Some of the prior art vehicles have included conventional road wheels, with the rear wheels being the driving wheels and the front wheels being the steerable wheels, and railroad wheels are attached to the vehicle for railroad track travel. In some instances the railroad wheels are retractable and distensable so that the vehicle can be driven on its road wheels to the railroad track, and the railroad wheels lowered down into engagment with the railroad track to support the vehicle from the railroad track. Usually the driving wheels at the rear of the vehicle are constructed so that the space between the rear wheels corresponds to the space between the rails of the railroad track, and the road driving wheels engage the rails and are used to propel and brake the vehicle as it moves along the rails. These prior art vehicles are usable for various maintenance jobs along railroad tracks. An example of a vehicle having both road wheels and railroad wheels is shown in U.S. Pat. No. 3,874,306.

The prior art also discloses self-propelled load carrying dump vehicles or "dump trucks" wherein the load carrying body is tiltable about an approximately horizontal axis so that the load can be dumped from the dump body through its rear opening, and wherein the dump body can rotate about an approximately upright axis so that the dump opening can be directed to the side of the vehicle as the load is being dumped. Examples of this type structure are disclosed in U.S. Pat. Nos. 1,432,328, 1,970,627 and 2,174,956. Vehicles of this type, wherein the dump body is not only tiltable but is also rotatable, are not generally available, apparently because the structure necessary for rotating the dump-body requires additional expense and maintenance, and because the vehicle can be turned on its road support wheels to direct the rear of the vehicle toward the area where it is desired to dump the load.

The prior art also discloses a load bearing vehicle mounted on railroad wheels for use only along railroad tracks, wherein the load bearing body is tiltable and rotatable so that the load can be dumped to the side of the railroad track while the vehicle is mounted on and aligned with the railroad track. An example of this type structure is found in U.S. Pat. No. 1,055,575.

The prior art also discloses many self-propelled load bearing vehicles that include a crane, winch or other loading means mounted on the vehicle for placing a load on and/or removing a load from the vehicle.

The prior art does not seem to disclose a self-propelled load carrying vehicle having road wheels and retractable railroad wheels and a rotary dump, together with a crane or other loading means for loading the dump and a conveyor means for displacing the load from the dump beyond the dump opening, far out to the side of the vehicle beyond the railroad tracks which support the vehicle.

SUMMARY OF THE INVENTION

Briefly described, the present invention comprises a self-propelled load bearing vehicle which includes a vehicle framework supported by road wheels, and retractable railroad wheels mounted on the vehicle framework and movable downwardly with respect to the vehicle for engagment with the rails of a railroad track. The rear driving wheels of the vehicle are spaced apart a distance corresponding to the spacing of the railroad wheels and tracks and engage the tracks when the railroad wheels are distended downwardly into engagment with the tracks, so that the rear road wheels propel and brake the vehicle on the railroad tracks. A sub-frame is rotatably mounted on the vehicle framework about an upwardly extending axis, and a dump body and a conveyor means are mounted on and movable with the sub-frame. The dump body is tiltable about an approximately horizontal axis on the sub-frame and the conveyor means is located at the rear dump opening of the dump body so that the load dumped from the dump body is dumped onto the conveyor means and the conveyor means progressively urges the load on beyond the rear dump opening of the dump body.

A crane assembly includes a boom and an operator's station supported on the vehicle framework in front of the dump body and the boom and operator's station are movable laterally across the vehicle framework, from a position beyond one side of the vehicle framework across the vehicle to a position beyond the other side of the vehicle framework. The jib lever and grapple of the crane assembly are supported by the boom, and the operator is able to move his operators' station and base of the boom to the side of the vehicle where an object is to be loaded into the dump body, and the grapple is able to reach down immediately adjacent and beyond the railroad tracks to grasp cross tie butts and various other objects that may be adjacent the track and load the objects into the dump body.

Thus, it is an object of this invention to provide a self-propelled load carrying vehicle that is movable both on road surfaces and along railroad tracks and which functions to load crosstie butts and other objects from adjacent the railroad tracks into a tiltable and rotatable dump body on the vehicle, and which functions to discharge the load from the dump body onto a conveyor means at the rear opening of the dump body for displacement far to the side of the railroad track.

Another object of this invention is to provide a versatile and relatively inexpensive multiple purpose vehicle which is usable both on and off a railroad track, and which is capable of loading railroad crossties and crosstie butts and other objects from adjacent railroad tracks into a dump body of the vehicle and which functions to dump the load to the side of the railroad tracks.

Other objects, features and advantages of the present invention will become apparent upon reading the following specification, when taken in conjunction with the accompanying drawings.

BRIEF DESCRIPTION OF THE DRAWINGS

FIG. 2 is a front view of the load carrying vehicle, showing the operators' station and the base of the crane assembly moved to one side of the vehicle.

FIG. 3 is a perspective illustration of the load carrying vehicle, illustrating the dump body in its rotated and tilted attitude.

FIG. 5 is a side elevational view of a portion of the vehicle framework and the sub-frame and dump body.

FIG. 6 is a detail elevational illustration of the latch mechanism for holding the sub-frame, dump body and rear discharge conveyor in alignment with the vehicle framework.

FIG. 7 is a side view, partially in cross section, of the conveyor means at the rear of the dump body.

FIG. 8 is a rear cross sectional detail of the conveyor means of FIG. 7, taken along lines 8—8 of FIG. 7.

FIG. 9 is a perspective detail illustration of the support structure for the operator's station and crane assembly.

FIG. 9A is a side detail illustration of a portion of the operator's platform, the support structure therefor and the brake.

FIG. 10 is a schematic illustration of the support structure of FIG. 9, illustrating the manner in which the operators' station and crane support platform move from one side to the other side of the vehicle.

FIG. 11 is a side view of the crane assembly, showing the boom, jib arm and grapple.

FIG. 12 is a perspective illustration of the grapple.

DETAILED DESCRIPTION

Figure 1:
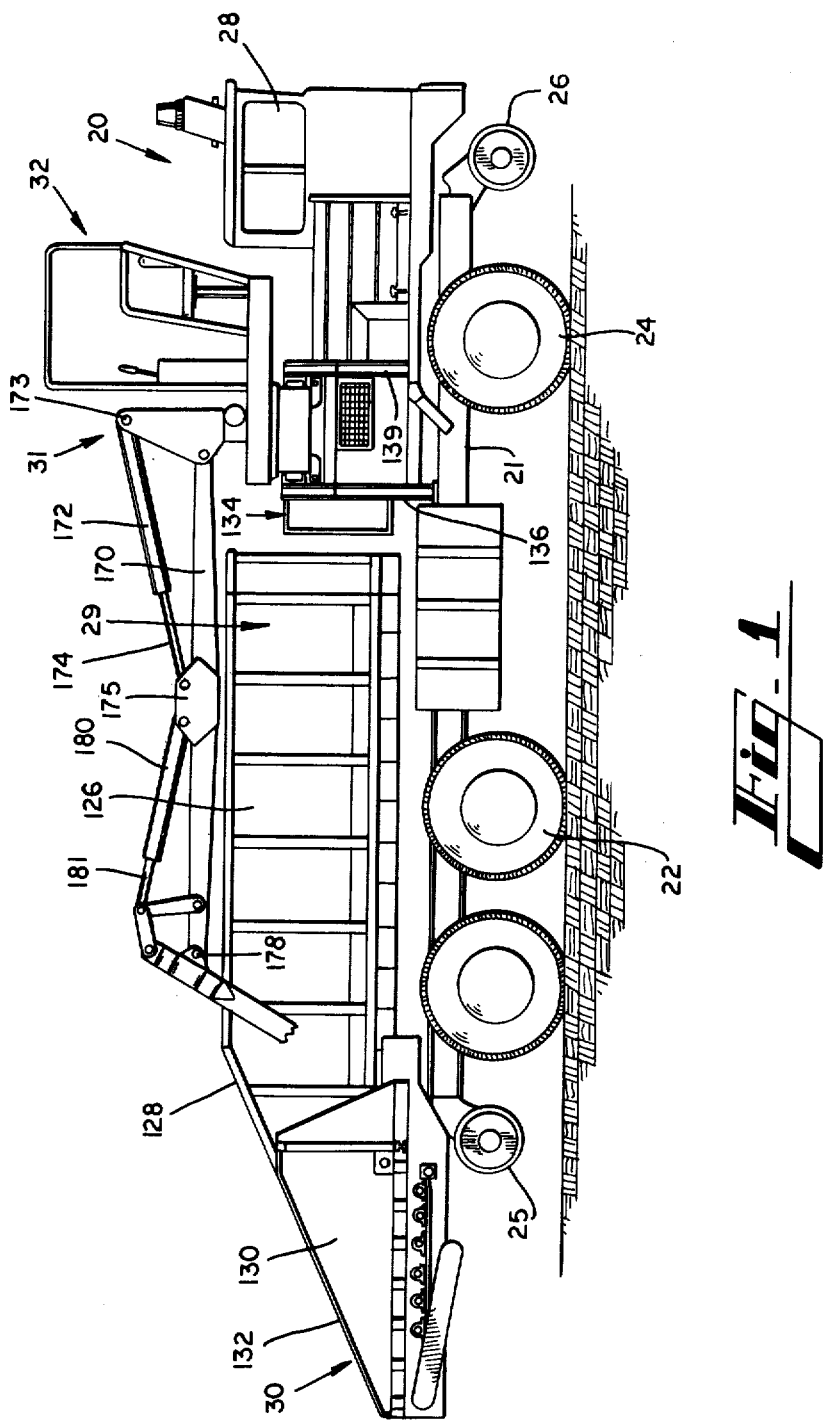
FIG. 1 is a side elevational view of the load carrying vehicle.

Referring now in more detail to the drawings, in which like numerals indicate like parts throughout the several views, FIGS. 1, 2 and 3 illustrate the load carrying vehicle 20 which includes vehicle framework 21, rear road driving wheels 22, front road steerable wheels 24, rear retractable railroad wheels 25 and front retractable railroad wheels 26. A driver's cab 28 is located on the front of framework 21, a rotary and tiltable dump body 29 is located approximately over the rear wheels of the vehicle, a conveyor means 30 is located behind the dump body 29, a crane assembly 31 and an exterior operator's station 32 are located in front of the dump-body 29, behind driver's cab 28.

The vehicle includes a conventional drive system and steering system (not shown) for its road wheels 22 and 24 which are controlable from driver's cab 28 in the conventional manner. The drive and brake system for the rear road wheels 22 is also controlable from the exterior operators' station 32. Moreover, the various functions of the vehicle such as the rotation and tilting of the dump body 29, the operation of the crane assembly 31 and the operation of the conveyor means 30 is controlable by the operator at the exterior operator's station 32 by a hydraulic system of the type disclosed in U.S. Pat. No. 4,077,328.

The rear and front retractable railroad wheels 25 and 26 are hydraulically actuated (not shown) and an example of the type of retractable railroad wheels structure that is suitable for use with the vehicle 20 is found in U.S. Pat. No. 4,133,269.

Figure 4:
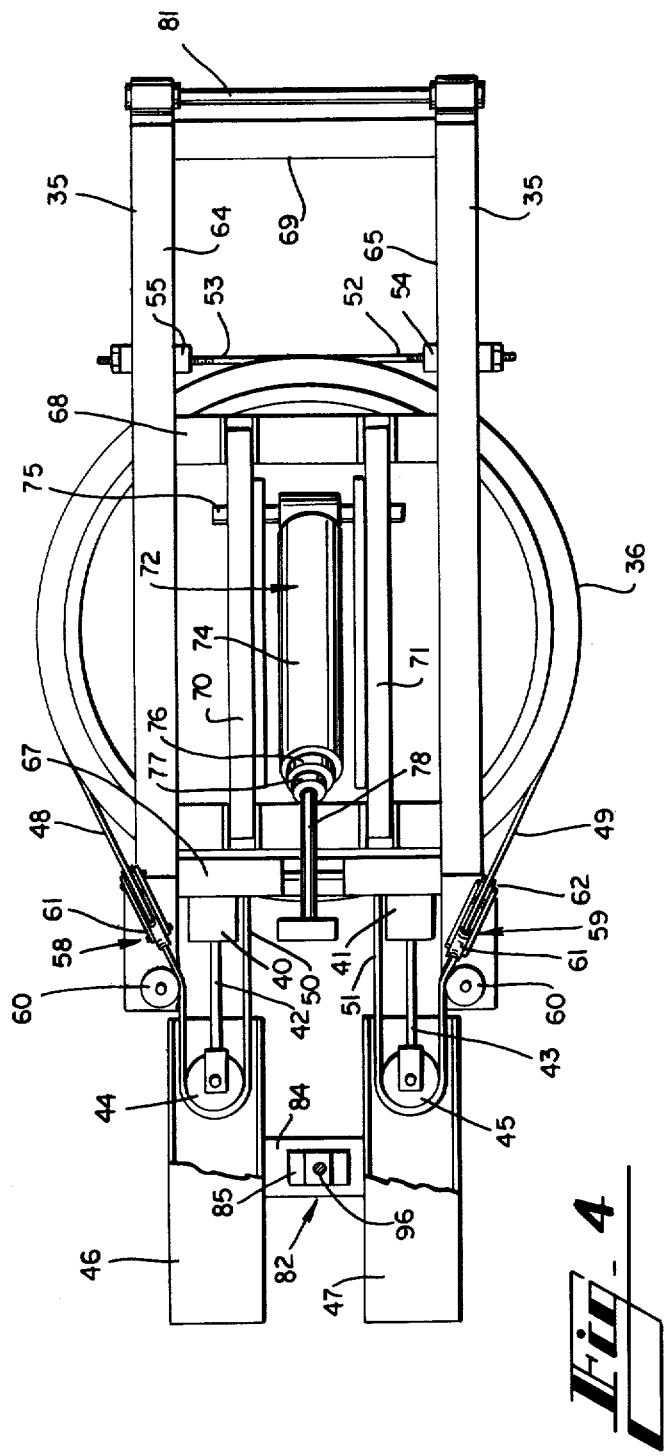
FIG. 4 is a top view of the sub-frame which rotates with respect to the vehicle framework and which carries the dump body and rear discharge conveyor, showing the dump cylinder and the dump body turn cylinders. This figure is taken along lines 4—4 of FIG. 5.

As illustrated in FIGS. 4 and 5, annular bearing 34 is bolted to the vehicle framework 21 and sub-frame or load support framework 35 is rotatably mounted on the annular bearing. An annular dump sheave 36 is rigidly connected to the sub-frame 35 and includes an annular track 38 for receiving a cable. A pair of hydraulic rams 40 and 41 (FIG. 4) are mounted beneath the annular bearing 34 and sheave 36 and are oriented in side by side, horizontal, parallel relationship, with their ramrods 42 and 43 extending in a forward direction with respect to the vehicle. Ram sheaves 44 and 45 are carried by the ends of ramrods 42 and 43, and cable housings 46 and 47 are positioned in alignment with the movement of the ramrods 42 and 43 and receive the ram sheaves 44 and 45 when the rams are distended. Cables 48 and 49 each have one of their ends 50 and 51 fastened to the vehicle framework, and each cable extends first in a forward direction about a ram sheave 44 or 45 and then rearwardly and in an opposite direction about the dump sheave 36, and the other ends 52 and 53 of the cables are connected to the adjustment tubes 54 and 55 attached to the sub-frame 35. The tension of cables 48 and 49 is adjusted by rotating the adjustment nuts of adjustment tubes 54 and 55.

Since the hydraulic rams 40 and 41 are located at a level below the dump sheave 36, it is necessary to guide the cables of 48 and 49 from the lower level of the rams 40 and 41 to the higher level of the dump sheave 36. Pulley assemblies 58 and 59 are positioned adjacent each ram 40 and 41 and each pulley assembly includes an alignment pulley 60 and an elevator pulley 61 and a guide pulley 62. The alignment pulley 60 is located at a position where it requires its cable to extend rearwardly from its ram pulley. The elevator pulley 61 receives the cable as it extends from the alignment pulley 60, and the cable extends through an arc upwardly from the elevator pulley toward the upper periphery of guide pulley 62. The elevator pulley 61 and guide pulley 62 extend on a line of tangency with respect to dump sheave 36. Thus the pulley assemblies 58 and 59 elevate the cables 48 and 49 and direct the cables at a tangent with respect to the dump sheave 36 and the ram sheaves 44 and 45, which allows the rams 40 and 41 to be located beneath the dump sheave 36 and the angular bearing 34.

As illustrated in FIG. 4, the sub-frame 35 is rectangular and includes side beams 64 and 65, and a plurality of intermediate braces such as braces 67, 68 and 69 extending between the side beams 64 and 65. A pair of longitudinal brackets 70 and 71 are mounted upon brace 67 and intermediate brace 68 and extend down into the annular bearing 34 and dump sheave 36. Multiple stage hydraulic dump cylinder 72 is positioned between the brackets 70 and 71 and its outer cylinder 74 has its butt end pivotally supported by pivot pin 75 and longitudinal brackets 70 and 71. Dump cylinder 72 is a multiple stage ram and includes the outer cylinder 74, intermediate cylinder 76 and inner cylinder 77. Cylinder rod 78 extends outwardly from the inner cylinder 77 and is connected to dump body 29 by means of bracket 79 and pin 80. Thus, dump cylinder 72 is inclined upwardly through sub-frame 35 and its rod 78 is connected to the forward portion of dump body 29. The other end of dump body 29 is connected to the sub-frame 35 by the dump pivot 81 which extends through aligned openings formed in the side beams 64 and 65 of the sub-frame 35 and in the dump body 29.

As illustrated in FIGS. 4, 5 and 6, lock means 82 is provided for locking dump body 29 in alignment with vehicle framework 21. Cross support 84 of vehicle framework 21 extends beneath cable housings 46 and 47, and lock stand 85 is mounted on the cross support 84. Lock plate 86 defines horizontal upper surface 88 and bevelled side surfaces 89 and 90, and horizontal upper surface 88 defines lock opening 91. Plunger assembly 92 is mounted on rotary dump body 29 and includes support braces 94, plunger housing 95 and downwardly directed plunger 96. Coil compression spring 98 is located within plunger housing 95 and urges plunger 96 in a downward direction. Bolt 99 extends through plunger 96 and its ends slide through elongated slot 100 of plunger housing 95, thus limiting the downward movement of plunger 96.

When the rotary dump body 29 is in its down or untilted position, and when the dump body 29 is being moved from an angled position back toward alignment with the vehicle framework 21, the lower end of plunger 96 is located below the horizontal upper surface 88 of lock plate 86 and will engage a bevelled side surface 88 or 90 of lock plate 86 and ride up the side surface and onto the horizontal upper surface 88 until the plunger 96 registers with the lock opening 91, whereupon coil compression spring 98 and the weight of the plunger 96 will cause the plunger to move down into the lock opening 91, thus locking the dump body 29 in alignment with the vehicle framework. Since there is no means provided to retract the plunger 96 from its lock opening 91, the dump body 29 must be tilted upwardly from its down position to lift plunger 96 out of lock opening 91 before dump body and sub-frame 35 can be rotated with respect to the vehicle framework.

As illustrated in FIGS. 1, 3, 7 and 8, conveyor means 30 is mounted to the rear end of sub-frame 35 and is therefore rotatable with the sub-frame. Conveyor means 30 includes cross brace 101 (FIGS. 7 and 8) which is rigidly mounted to the bottom flanges of side beams 64 and 65 of sub-frame 35, side connector plates 102 and 103 oriented parallel to sub-frame 35 and in an upright attitude, each riggedly mounted to the ends of cross brace 101, intermediate connector plate 104 rigidly mounted to cross brace 101, I-beams 105, 106 and 107 extending transversely across the rear of sub-frame 35, with the ends of I-beam 106 resting on the lower flanges of side beams 64 and 65 of sub-frame 35 and with one end of each of I-beams 105 and 107 resting on the lower flanges of the side beams. Support plates 109 and 110 extend longitudinally at each side of the sub-frame exteriornally of side connector plates 102 and 103 and support the outer ends of I-beams 105 and 107. Cross beams 111 and 112 extend laterally outwardly from side beams 64 and 65 of sub-frame 35 and are butt welded to side connector plates 102 and 103.

As shown in FIG. 8, longitudinally extending conveyor support channels 114, 115, 116 and 117 are mounted to side connector plates 102 and 103 and intermediate connector plate 104 and extend parallel to one another and horizontally from beneath the rear opening of dump body 29 on beyond the dump body. As illustrated in FIG. 7, a plurality of cross beams 118 are connected to the bottom flanges of channels 114–117 to stabilize the channels. A plurality of conveyor rollers 119 extend between channels 114 and 115 and between channels 116 and 117 to form a pair of adjacent conveyor belt beds. Larger diameter belt drive rollers 120 are located at the rear discharge end of conveyor means 30 and larger diameter tail rollers 121 are located at the entrance of the conveyor means, beneath the rear discharge opening of dump body 29. A pair of continuous conveyor belts 122 are mounted about rollers 119-121 and slack roller 124 is biased into the lower flight of the belts to maintain desired tension in the belts. The drive motor (not shown) beneath conveyor belts 122 is connected to the drive spockets of drive rollers 120 through a continuous chain 123.

As illustrated in FIG. 3, dump body 29 includes parallel upright side walls 125 and 126, front wall 127 and a bottom pan. The rear upper edges of side walls 125 and 126 are angled downwardly at 128 and 129. Side walls 130 and 131 extend upwardly from conveyor means 30 with the upper edges thereof 132 and 133 being sloped at an angle corresponding to the angle of the upper edges 128 and 129 of dump body 29. The side walls 130 and 131 of conveyor means 30 are displaced outwardly from the side walls 125 and 126 of dump body 29, so that when the dump body is tilted its side walls will telescope inwardly with respect to the nontilting side walls of conveyor means 30. However, when dump body 29 is in its down position the upper edges 132 and 133 of the conveyor means side walls effectively form a continuation of the upper edges 128 and 129 of the dump body side walls.

As illustrated in FIGS. 1 and 9, crane assembly 31 and external operator's station 32 are supported by crane support assembly 134 which is mounted on framework 21 of the vehicle 20. Crane support assembly 134 comprises upright support stanchions 136, 137, 138 and 139 and horizontal, parallel channel beams 140 and 141 mounted on the upper ends of the stanchions with their openings facing each other. Channel means 140 and 141 comprise track means for a support trolley 142. Support trolley 142 comprises a rectangular frame formed from side rails 144 and 145, and end beams such as end beam 146 connected at its ends to the ends of side rails 144 and 145. Side rails 144 and 145 are received in the openings of channel beams 140 and 141 and are movable therethrough. Appropriate bearings (not shown) are interposed between side rails 144 and 145 and channel beams 140 and 141 to assist the movement of the trolley 142 along its track means. Crane support platform 148 is supported on trolley 142 and includes a pair of parallel beams 149 and 150 that are rigidly mounted to platform 148, and beams 149 and 150 are positioned between and movable along the inner surfaces of side rails 144 and 145 of trolley 142. A flat gear path 143 is mounted on the top surface of each side rail 144 and 145. Gears 147 are rigidly mounted on the ends of axle 147a and rotatably engage tracks 143. Axle 147a extends through beams 149 and 150 to movably support platform 148 on the top surface of side rails 144 and 145. Thus, crane support platform 148 is movable with respect to trolley 142 and trolley 142 is movable with respect to the track means formed by channel beams 140 and 141.

As schematically illustrated in FIG. 10, transfer chain 151 is connected at its ends to the opposite ends of trolley 142, and the intermediate portions of transfer chain 151 extend about guide sprockets 152 and 153 and about drive sprocket 154. Reversible hydraulic motor 155 drives tht drive sprocket 154. When motor 155 is energized, sprocket 154 pulls chain 151, causing trolley 142 to move along channels 140 and 141, from one side to the other side of the crane support assembly 134. The channel beams 140 and 141 are approximately 8 feet in length, substantially equal to the width of the vehicle 20, and trolley 142 is movable partially out of the open ends of channel beams 140 and 141.

Shifting chain 156 is an endless chain and extends about sprockets 158 and 159 that are carried at opposite ends of trolley 142. Shifting chain 156 is fixed at 160 to trolley 142 and is fixed at 161 to crane support platform 148. With this arrangement, when transfer chain 151 is moved by motor 155 to shift trolley 142 from one side to the other side of the vehicle, the sprockets 158 and 159 tend to walk along the lower flight 156a of shifting chain 156, so that the lower flight 156a of shifting chain 156 remains in a static position while the upper flight 156b moves twice as fast as trolley 142. Since crane support platform 148 is connected at 161 to the upper flight 156b of shifting chain 156, crane support platform 148 will move twice as fast as trolley 142, from one end of the trolley to the other end of the trolley as the trolley moves from one side to the other side of the vehicle. The arrangement is such that when the trolley 142 has been moved by transfer chain 151 to one of its extreme side positions, shifting chain 156 will have shifted crane support platform 140 to a corresponding extreme position, which is beyond the side of the vehicle. Since the crane support assembly 134 is located between the driver's cab 28 and the dump body 29, the operator's station 32 and the base of crane assembly 31 (FIGS. 1, 2 and 3) can move from one side to the other side of the vehicle without obstruction.

As illustrated in FIGS. 9 and 10 platform cam locking assemblies 162 are mounted on beams 149 and 150 beneath platform 148 and each includes a vertically movable brake shoe 163, a vertical support arm 163a and a cam 164. Pneumatic motor 164a operates its lever to rotate cams 164 to engage the top surface of the side rails 144, 145 of trolley 142, and when the cams engage the side rails they lift their vertical support arms 163a and brake shoe 163 so that the brake shoe engages the bottom surface of its side rail 144 or 145, thus locking the platform in a rigid position on the trolley and stabilizing the crane assembly.

As illustrated in FIGS. 2, 9 and 11, crane assembly 31 comprises upright support mast 165 which is rotatably supported in crane support platform 148. Double acting hydraulic cylinder 166 extends in a horizontal attitude with respect to crane support mast 165 and its rod (not shown) includes gear teeth engageable with a sprocket connected to crane support mast 165, thus functioning to control the rotation of the mast. Upright boom support plates 168 and 169 are positioned on opposite sides of the support mast 165, and spar or boom 170 is pivotally connected at one of its ends by means of boom pivot pin 171 to boom support plates 168 and 169. Boom cylinder 172 is connected by means of its pivot pin 173 to the upper ends of boom support plates 168 and 169, and cylinder rod 174 is connected to bracket 175 intermediate the ends of boom 170. Thus, retraction and distention of cylinder rod 174 with respect to cylinder 172 causes boom 170 to tilt up and down. Jib lever 176 is pivotally mounted by means of its pivot pin 178 at a position intermediate its ends to the distal end 179 of boom 170. Jib cylinder 180 is connected at one its ends to boom bracket 175 and its cylinder rod 181 is connected through a linkage 177 to the upper end of jib lever 176. Thus, retraction and distention of cylinder rod 181 of jib cylinder 180 causes jib lever 176 to tilt about the distal end of boom 170.

Grapple 184 is mounted on the lower end of jib lever 176 and includes base 185 mounted on jib lever 176, rake 186 pivotally mounted on base 185 and clamp 188 pivotally mounted on base 185. As shown in FIG. 12, rake 186 includes head 189 with a plurality of tines 190 projecting in parallel canterlevered relationship from head 189 and bracket 191 extending rearwardly from head 189. Linkage 192 (FIG. 11) is connected between head 189 and base 185 and comprises base link 194 and head link 195 with base link 194 being pivotally connected by its pivot pin 196 to base 185 and pivotally connected by cylinder pin 198 to one end of head link 195, and head link 195 is connected at its other end by means of head pin 199 to bracket 191. Rake cylinder 200 is mounted to jib lever bracket 201 by means of pin 202, and cylinder rod 204 is connected by cylinder pin 198 to linkage 192. Thus, when cylinder rod 204 is retracted and distended from its cylinder 200, rake 186 pivots about rake pivot pin 187 between positions where the tines 190 of the rake are approximately coextensive with the length of jib lever 176 and a position where the tines extend at an acute angle with respect jib lever 176.

Clamp 188 comprises a pair of parallel rectilinear tines 204 pivotally mounted by means of clamp pivot pin 205 to base 185, and their distal free ends move into the spaces between the rake tines 190 wherein the rake and clamp are moved toward their closed positions. Clamp cylinder 206 is pivotally mounted on jib lever bracket 201 by means of clamp cylinder pin 207, and its rod 208 is pivotally connected at its distal end to the pivot pin 209 of clamp 188 intermediate the ends of clamp tines 204.

The arrangement of grapple 184 allows the rake 186 to be used to scrape along the ground surface to pull and dislodge objects from and along the ground, whereby the protruding ends of the rake tines 190 can penetrate the ground to reach beneath and dig out objects such as partially covered cross tie butts. When the objects are close enough to the railroad track from which the vehicle is supported, the rake of the grapple can be pivoted toward its closed position so that its tines 190 can reach horizontally beneath the object and support the object. The clamp 188 can remain open and out of the way while the rake is doing its job, and once the object has been moved onto the tines of the rake, the clamp can be moved to its closed position with respect to the rake and capture the object in the confines of the grapple. The grapple is then moved from ground level up over the dump body 29 and then opened to permit the object captured therein to fall into the dump body.

OPERATION

The load bearing vehicle 20 can be used in many ways, but its primary intended use is for maintainence along railroad tracks for retrieving and handling crosstie butts, where old crossties have been dislodged and removed from beneath the rails of a railroad track and new crossties have been replaced in the space of the old crosstie. The vehicle is driven on a road surface to the railroad track and then turned parallel to the railroad track so that its railroad wheels are positioned over the rails. The hydraulic system of the vehicle is actuated to lower the railroad wheels down into engagement with the rails of the railroad track so that the vehicle is supported by and guided along the rails. The rear driving wheels of the vehicle also engage the rails and can be operated to propel the vehicle along the rails and to brake the vehicle.

Once the vehicle has been positioned on the rails of the railroad track, the operator will usually operate the vehicle from the exterior operator's station 32 where he can see objects about the vehicle along the railroad track. His control station includes means for rotating and braking the rear drive wheels of the vehicle, so that he can cause the vehicle to move along the rails.

When the vehicle reaches a location along the railroad track where objects are present to be loaded into the vehicle, the operator, who usually sits in the operator's chair 210 at the control panel 211, actuates motor 155 (FIG. 10) so as to shift crane support platform 148 to one side of the vehicle, thus locating the operator's chair 210 and the base of the boom 170 of the crane assembly 31 beyond one side of the vehicle, where the operator can see the objects to be loaded. The operator, by manipulation of the various valves at the exterior operator's station 32, causes crane assembly 31 to grasp and load the objects from the ground surface into the dump body 29. The extreme lateral position of the crane assembly 31 with respect to the vehicle allows the grapple 184 access to any object within the radius of its reach on one side of the vehicle. There are no blind spots or locations that are inaccessible to the grapple. The operator can remain at the operator's station as the vehicle progresses along the rails of the railroad track, stopping intermittently to load on more objects, as necessary.

When the rotary dump body 29 is filled, or when the job is done, the operator, still at the exterior operator's station 32, moves the vehicle along the rails to a dump area. In order to stabilize the vehicle during the dumping operation, the operator will usually place the grapple 184 against the ground surface at the side of the vehicle, causing the grapple to act as an outrigger. The operator then slightly tilts the dump body 29 so that the lock means 82 (FIGS. 4, 5 and 6) between the dump body 29 and the vehicle framework 21 disengages and permits the dump body to be rotated with respect to the framework. The operator then causes the sub-frame 35, dump body 29 and conveyor means 30 to rotate by distending one of the hydraulic rams 40 or 41 and retracting the other of the rams (FIG. 4). When the rear opening of the dump body and conveying means 30 are projected to the side of the railroad track, the conveying means 30 is energized by actuating its drive motor (not shown), causing the upper surfaces of the conveyor belts 122 to move from beneath the dump body on beyond the dump body. The dump body is then tilted further by its hydraulic dump cylinder 72 (FIG. 5), thereby the increasing slope of the bottom pan of the dump body to induce the load to move through the rear dump opening of the dump body. Since the dump body side walls 128 and 129 are displaced inwardly of the conveyor means side walls 130 and 131, the load in dump body 29 moves smoothly under the influence of gravity down the inclined dump bed progressively onto the upper flights of the conveyor belts of conveyor means 30. The conveyor belts actively urge the load being dumped thereon from the dump body on horizontally beyond the dump body, and when the load reaches the end of the conveyor belts, the load has a drop to the ground that is sufficient to cause most objects to fall away from the end of the conveyor. In some instances, the longer crossties and other elongated objects may tend to lean against the end of the conveyor means; however, oncoming objects in the load tend to remove the crossties from the vicinity of the conveyor means, and when the conveyor means is rotated with the sub-frame and dump body, these objects will tend to fall away from the conveyor means.

When the load has been discharged from the dump body and conveyor means, the dump body is lowered back to its down position and the sub-frame, dump body and conveyor means are rotated back into alignment with the vehicle framework. As the dump body approaches its aligned position, its lock means 82 re-engages, by plunger 96 riding up over one of the bevelled side surfaces 89 or 90 and then falling into the lock opening 91. This maintains the sub-frame, dumpbody and conveyor means in alignment with the vehicle framework, and prevents inadvertent swinging of these elements with respect to the framework.

While this invention has been described in detail with particular reference to a preferred embodiment thereof, it will be understood that variations and modifications can be effected within the spirit and scope of the invention as described hereinbefore and as defined in the appended claims.

I claim:

1. A load carrying vehicle comprising a framework, road wheels, means for mounting said road wheels on said framework for supporting said framework from a road surface, railroad wheels, retractable means for mounting said railroad wheels on said framework for lifting the railroad wheels with respect to the vehicle and for lowering the railroad wheels to engage the rails of a railroad track and to support said framework from a railroad track, a sub-frame mounted on said framework for rotation about an approximately upright axis with respect to said framework, a load carrying dump body with a rear opening mounted on said sub-frame for carrying a load therein, means for rotating said sub-frame and said load carrying dump body about the approximately upright axis for directing the dumping of the load from said dump body at various positions about the vehicle, conveyor means positioned behind and at a level lower than the rear opening of said dump body and mounted to said sub-frame for rotation in unison with said sub-frame with said dump body, means for tilting said load carrying dump body with respect to said sub-frame and with respect to said conveyor means for dumping the load from the rear opening of said dump body onto said conveyor means, said conveyor means including means for urging the load dumped from said dump body further beyond said dump body, a crane assembly mounted on said framework with a boom pivotable at one of its ends about an upright axis, an operator's station mounted on said framework adjacent said boom, means for moving said boom and said operator's station in unison from a position beyond one side of said dump body to a position beyond the other side of said dump body whereby when the vehicle is mounted on a railroad track and its railroad wheels are moved down into supporting relationship on a railroad track the crane assembly and operator's station can be moved to either side of the dump body for loading the dump body and after the dump body has been loaded the dump body can be rotated to direct the rear opening and the conveyor means out to the side of the railroad track and the dump body tilted with respect to the conveyor means to progressively move the load from the dump body onto the conveyor means, and the conveyor means operated to progressively move the load further beyond the dump body and to a position beyond the railroad track.

2. The load carrying vehicle of claim 1 and wherein said conveyor means comprises a belt conveyor apparatus including an upper belt flight movable in a substantially horizontal direction from adjacent said dump body outwardly away from said dump body.

3. A load carrying vehicle comprising a framework, road wheels, means for mounting said road wheels on said framework for supporting said framework and moving said framework forwardly along a road surface and the like, railroad wheels, retractable means for mounting said railroad wheels on said framework and for lifting the railroad wheels with respect to the vehicle and for lowering the railroad wheels to engage the rails of a railroad track and supporting said framework on and guiding said framework along the railroad track, a sub-frame mounted on said framework and rotatable about an upright axis with respect to said framework, a load carrying dump body mounted on and rotatable with said sub-frame, said dump body including a bottom pan, upright opposed sidewalls extending up from the sides of said bottom pan and a rear opening, said dump body being pivotally connected to said sub-frame about an approximately horizontal axis, means for tilting said dump body with respect to said sub-frame about said approximately horizontal axis to dump the load from said dump body through its rear opening, conveyor means positioned behind and below said dump body and mounted on said sub-frame and rotatable about the upright axis with said sub-frame for receiving the load dumped from said dump body, said conveyor means including means for urging the load dumped from the rear opening of said dump body further beyond the dump body, a crane assembly mounted on said framework and including a boom pivotably mounted at one of its ends about an upright axis, a jib lever pivotable at one of its ends to the other end of said boom, and grasping means mounted on the other end of said jib lever, said grasping means including a rake pivotably mounted on said jib lever and including a plurality of parallel tines, and a clamp member pivotably mounted on said jib lever including a plurality of parallel tines, and means for pivoting said rake toward and away from said clamp member, and means for pivoting said clamp member toward and away from said rake means so that their tines are movable into and out of grasping relationship with respect to each other, and means for moving said boom and said operator's station in unison from a position beyond one side of the vehicle to a position beyond the other side of the vehicle, whereby when the vehicle is mounted on the rails of a railroad track the boom and operator's station can be moved to either side of the vehicle to load the dump body and the dump body can be rotated about its upright axis and tilted about its approximately horizontal axis to discharge the load through the rear opening of the dump body onto the conveyor means and the conveyor means urges the load on beyond the rear opening of the dump body out to the side away from the rails of the railroad track.

4. The vehicle of claim 3 and wherein said conveyor means extends out from beneath said dump body on beyond said dump body, and wherein said dump body is pivotable with respect to said conveyor means.

5. The vehicle of claim 3 and wherein said conveyor means comprises a belt conveyor assembly connected at one of its ends to said sub-frame and including a conveyor belt with an upper belt flight movable out from beneath the rear opening of said dump body approximately horizontally beyond said dump body, and drives means for moving said conveyor belt.

6. The vehicle of claim 3 and further including lock means for holding said sub-frame and said dump body in alignment with said framework and for releasing said sub-frame and dump body with respect to said framework when said dump body is tilted with respect to said framework.

7. The vehicle of claim 3 and further including lock means comprising a first lock element connected to said framework and a second lock element connected to said dump body, said first and second lock elements being positioned to engage and lock to each other when said dump body is down and aligned with said framework and to disengage when said dump body is tilted with respect to said framework, whereby the sub-frame, dump body and conveyor means are held in alignment with the vehicle framework as long as the dump body is down and aligned with the vehicle framework.

8. A load carrying vehicle comprising a vehicle framework, road wheels, means for mounting said road wheels on said vehicle framework for movably supporting said vehicle from a road surface, a dump body pivotally mounted on said vehicle framework about a first approximately horizontal axis and rotatably mounted on said vehicle framework about an approximately vertical axis, means for tipping said dump body from a down position upwardly about said horizontal axis and for rotating said dump body about said vertical axis, said dump body including a bottom pan and opposed sidewalls extending upwardly from said bottom pan and defining a rear opening for dumping its load, railroad wheels, retractable means for mounting said railroad wheels on said vehicle framework for lifting said railroad wheels with respect to said framework and for lowering said railroad wheels to engage the rails of a railroad track and supporting the vehicle on the rails of the railroad track, whereby the dump body is rotatable about is upwardly extending axis for guiding the load of the dump body out to the side of the rails of the railroad track when the dump body is tilted, a crane assembly mounted on said framework at a position adjacent the front wall of said dump body when said dump body is aligned with said framework, said crane assembly comprising a boom mounted at one of its ends on said framework and pivotable about an upright axis at its said one end with respect to said framework, a jib lever pivotably mounted at one of its ends to said boom, grasping means mounted at the other end of said jib lever, an operator's station on said framework at said crane assembly, and means for moving said one end of said boom and said operator's station from a position beyond one side to a position beyond the other side of said framework which enables the said grasping means to retrieve objects next adjacent the vehicle when the vehicle is mounted on a railroad track.

9. The vehicle of claim 8 and further including a sub-frame rotatably mounted to said framework, said dump body being pivotably mounted on sub-frame, and conveyor means mounted on said sub-frame adjacent the rear opening of said dump body for receiving the load dumped from said dump body and for urging the load away from said dump body.

10. The vehicle of claim 8 and wherein said framework includes track means extending across the length of said framework, wherein said crane assembly includes a support trolley movable along said track means from a position having one end portion thereof extending beyond one end of said track means to a position having the other end thereof extending beyond the other end of said track means, and crane assembly support means mounted on said support trolley and movable from one end position to the other end position of said support trolley, and means for moving said crane assembly support means from one end position to the other end position of said support trolley as the support trolley moves from a position where its one end portion extends beyond one end of said track means to a position where its other end portion extends beyond the other end of said track means.

11. The vehicle of claim 8 and further including lock means for holding said dump body in alignment with respect to the vehicle framework when said dump body is in its down position.

12. A process of delivering a load of material along side a railroad track comprising supporting and moving a vehicle with a dump body having a rear discharge opening on the rails of a railroad track, moving a crane assembly and an operator's control station for the crane assembly across the vehicle from a position beyond one side of the vehicle to a position beyond the other side of the vehicle and loading with the crane the dump body with the material from adjacent the railroad track, rotating the dump body with respect to the vehicle so that the rear discharge opening of the dump body faces to the side of the rails of the railroad track, and tilting the dump body to discharge the load of material toward the side of the rails of the railroad track while the vehicle is supported on the rails of the railroad track and conveying the load beyond the rear discharge opening to discharge the load away from the rails of the railroad track.

* * * * *